United States Patent
Du et al.

(10) Patent No.: US 9,936,425 B2
(45) Date of Patent: Apr. 3, 2018

(54) HANDOVER OF A DEVICE WITH COEXISTING RADIOS

(75) Inventors: Lei Du, Beijing (CN); De Shan Miao, Beijing (CN); Yi Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 644 days.

(21) Appl. No.: 14/116,837

(22) PCT Filed: May 11, 2011

(86) PCT No.: PCT/CN2011/073916
§ 371 (c)(1),
(2), (4) Date: Jan. 6, 2014

(87) PCT Pub. No.: WO2012/151746
PCT Pub. Date: Nov. 15, 2012

(65) Prior Publication Data
US 2014/0120916 A1 May 1, 2014

(51) Int. Cl.
*H04W 36/00* (2009.01)
*H04W 36/28* (2009.01)
*H04W 88/06* (2009.01)

(52) U.S. Cl.
CPC ... *H04W 36/0022* (2013.01); *H04W 36/0055* (2013.01); *H04W 36/28* (2013.01); *H04W 88/06* (2013.01)

(58) Field of Classification Search
CPC ......... H04W 36/0022; H04W 36/0055; H04W 36/28; H04W 88/06
See application file for complete search history.

(56) References Cited

U.S. PATENT DOCUMENTS

| 9,258,833 B2 * | 2/2016 | Bitran ................... H04W 16/14 |
| 2009/0129332 A1 * | 5/2009 | Dayal ................... H04B 7/2615 |
| | | 370/330 |

(Continued)

FOREIGN PATENT DOCUMENTS

| CN | 1735273 A | 2/2006 |
| CN | 1887020 A | 12/2006 |

(Continued)

OTHER PUBLICATIONS

CMCC et al: R2-110391; Framework and procedure of in-device coexistence interference avoidance 3GPP Draft TSG-RAN WG2 Meeting #72bis, Dublin, Ireland, Jan. 17-21, 2011, Jan. 11, 2011, XP050605603, [retrieved on Jan. 11, 2011]; chapter 2.3.1; chapter 2.3.2; chapter 2.3.3; chapter 2.3.4.

(Continued)

*Primary Examiner* — Mehmood B Khan
(74) *Attorney, Agent, or Firm* — Harrington & Smith (57) ABSTRACT

Methods and apparatuses for controlling a handover of a device communicating via coexisting radios separated in time. It is determined whether to continue the communications via the coexisting radios during the handover and information is signaled to the device regarding communications via the coexisting radios based on the determination. The determination can include negotiations between a source and a target station. The source and/or the target station may determine whether to continue the communications via the coexisting radios during the handover, and selectively signaling information regarding communications during the handover via the coexisting radios based on the determination. The device, upon receiving signaling containing information whether to continue the communications via the coexisting radios during handover, processes the handover and selectively communicates via at least one of (Continued)

the coexisting radios during the handover based on the information.

18 Claims, 6 Drawing Sheets

(56) References Cited

U.S. PATENT DOCUMENTS

| | | | | |
|---|---|---|---|---|
| 2009/0305703 | A1* | 12/2009 | Shang | H04W 88/12 455/436 |
| 2010/0027525 | A1 | 2/2010 | Zhu | |
| 2011/0243047 | A1* | 10/2011 | Dayal | H04W 16/14 370/311 |
| 2011/0312288 | A1* | 12/2011 | Fu | H04B 1/406 455/88 |
| 2012/0020229 | A1* | 1/2012 | Dayal | H04W 16/14 370/252 |
| 2012/0020231 | A1* | 1/2012 | Chen | H04W 36/08 370/252 |
| 2012/0069766 | A1* | 3/2012 | Fu | H04B 1/406 370/252 |
| 2012/0087341 | A1* | 4/2012 | Jang | H04W 72/1215 370/331 |
| 2012/0188907 | A1* | 7/2012 | Dayal | H04W 72/1215 370/254 |
| 2012/0202542 | A1* | 8/2012 | Dimou | H04W 72/1231 455/509 |
| 2012/0207040 | A1* | 8/2012 | Comsa | H04W 72/1215 370/252 |
| 2012/0213116 | A1* | 8/2012 | Koo | H04B 1/1027 370/253 |
| 2012/0213162 | A1* | 8/2012 | Koo | H04W 16/14 370/329 |
| 2012/0252442 | A1* | 10/2012 | Fu | H04W 24/10 455/426.1 |
| 2012/0281563 | A1* | 11/2012 | Comsa | H04W 24/10 370/252 |
| 2013/0242919 | A1* | 9/2013 | Koo | H04W 72/1215 370/329 |
| 2013/0294412 | A1* | 11/2013 | Wang | H04W 16/14 370/331 |
| 2014/0010205 | A1* | 1/2014 | Sebire | H04W 36/0083 370/331 |
| 2014/0031036 | A1* | 1/2014 | Koo | H04W 36/14 455/434 |

FOREIGN PATENT DOCUMENTS

| | | | |
|---|---|---|---|
| CN | 101640565 A | 2/2010 | |
| EP | 1 626 600 A2 | 2/2006 | |
| KR | 20120111818 A * | 10/2012 | H04W 36/0072 |

OTHER PUBLICATIONS

3GPP: 3GPP TR 36.816 V1.3.0 (Apr. 2011); 3rd Generation Partnership Project; Technical Specification Group Radio Access Networks; Evolved Universal Terrestrial Radio Access (E-UTRA); Study on signalling and procedure for interference avoidance for in-device coexistence; (Release 10) 3GPP Standard, vol. RAN WG2, No. v1.3.0, Apr. 25, 2011, pp. 1-40, XP050692494, [retrieved on Apr. 25, 2011]; chapter 5.2.1.2.

LG Electronics Inc.: R2-106563; Necessity of on/off indication for avoiding in-device coexistence interference 3GPP Draft TSG-RAN2 Meeting #72, Jacksonville, U.S.A., Nov. 15-Nov. 19, 2010, Nov. 9, 2010, XP050492341, [retrieved on Nov. 9, 2010]; chapter 2.2.

Samsung: R2-105576; Is LTE and BT in-device coexistence possible without TDM gap pattern? 3GPP Draft TSG-RAN WG2 #71 bis, Oct. 11-Oct. 15, 2010, Xian, China, Oct. 5, 2010, XP050452636, [retrieved on Oct. 5, 2010]; chapter Discussion.

3GPP TR 36.816 v1.0.0 (Nov. 2010); 3rd Generation Partnership Project; Technical Specification Group Radio Access Networks; Evolved Universal Terrestrial Radio Access (E-UTRA); Study on signalling and procedure for interference avoidance for in-device coexistence; (Release 10).

* cited by examiner

HANDOVER OF A DEVICE WITH COEXISTING RADIOS

This disclosure relates to handover of a device and more particularly to communications by a wireless device provided with coexisting radios during a handover.

A communication system provides a facility that enables communication sessions between two or more entities such as fixed or mobile communication devices, base stations, servers and/or other communication nodes. A communication system and compatible communicating entities typically operate in accordance with a given standard and/or specification setting out how the various entities shall operate. In a wireless communication system at least a part of the communication between at least two devices, or stations occurs over a wireless interface. Examples of wireless systems include public land mobile networks (PLMN) such as cellular networks, satellite based communication systems and different wireless local networks, for example wireless local area networks (WLAN). A wireless radio connection can also be provide by short range radio, for example based on the Bluetooth™ radio.

An example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Communications can be provided between appropriate communication devices. In a wireless system a communication device can provide a transceiver station that can communicate with another communication device such as e.g. base stations of access networks and/or other user equipments. A communication device of a user is often referred to as user equipment (UE) or terminal. A communication device is provided with an appropriate signal receiving and transmitting arrangement for enabling communication of data and signalling with other parties.

A communication device can be provided with a multiple of coexisting radios in order to allow users to access various networks and services ubiquitously. For example, a wireless communication device can be equipped with multiple radio transceivers. In accordance with a more particular example a mobile device may be equipped with a cellular radio (e.g. LTE), a wireless local area network (e.g. WiFi™), and a short range radio (e.g. Bluetooth™) transceivers, and global navigation satellite system (GNSS) receivers. This can cause problems in view of interference, and more particularly, coexistence interference between the collocated radio transceivers. In-device coexistence interference can occur for example when transmitting in one frequency band interferes with receiving in another band within the same user equipment.

A serving base station can be used to mitigate the effect of the coexistence interference. A proposal for mitigating the coexistence interference is known as a time domain multiplexing (TDM) solution. The TDM solution aims to separate the different bands in time domain, typically such that scheduled and unscheduled periods are alternated on problematic frequencies to ensure that transmission of a radio signal do not coincide with reception of another radio signal. For example, an Industrial, Scientific and Medical (ISM) radio signal can be transmitted during a period that does not overlap a period during which a LTE user equipment may be scheduled to transmit or receive, and vice versa, thereby allowing the industrial, scientific and medical (ISM) band radio to operate without interference. One of the proposals for avoidance of in-device coexistence interference in relation to the LTE is for the user equipment to signal information to the radio access network based on which the base station can then decide when transmission/reception in various bands may take place. A LTE access system can then rely on information signalled from the user equipment in scheduling. For the TDM solution, the user equipment can signal a suggested pattern to the radio access system. Based on such information, the final TDM patterns (i.e. scheduling and unscheduled periods) can be configured by the radio access system.

Embodiments of the invention aim to address an undefined situation which may arise when a device communication via coexisting radios is handed over from a station to another to avoid problems such as handover failures, unnecessary dropping of connections and/or unnecessarily long interruptions caused by handovers. It is noted that the issues are not limited to any particular communication system, standard, specification, radios and so forth, but may occur in any communication device and/or system where a device with coexisting radios can be handed over between stations.

In accordance with an embodiment there is provided a method for controlling a handover of a device with coexisting radios, comprising: communicating with the device via the coexisting radios, the communications via the coexisting radios being separated in a time domain, determining whether to continue the communications via the coexisting radios during handover to a target station, and selectively signaling information to the device regarding communications via the coexisting radios based on the determination.

In accordance with another embodiment there is provided a method for controlling a handover of a device, comprising: receiving at a target station a request for handover of the device and an indication that the device communicates with a source station via coexisting radios separated in a time domain, determining whether to continue the communications via the coexisting radios during the handover, and selectively signaling information to the source station regarding communications during the handover via the coexisting radios based on the determination.

In accordance with another embodiment there is provided a method of operating a device with coexisting radios, comprising communicating via the coexisting radios with a source station, the communications via the coexisting radios being separated in a time domain, receiving signaling containing information whether to continue the communications via the coexisting radios during handover to a target station, processing the handover, and selectively communicating via at least one of the coexisting radios during the handover based on the instructions.

In accordance with an embodiment there is provided an apparatus comprising at least one processor, and at least one memory including computer program code, wherein the at least one memory and the computer program code are configured, with the at least one processor, to perform at least one of the methods. A user equipment and/or base station comprising the apparatus configured to provide at least one of the embodiments can also be provided.

In accordance with a more detailed embodiment negotiations may take place between the source and target stations. The determining may comprise taking into account information received from the target station. For example, a decision can be made whether to continue the communications via the coexisting radios based on a configuration pattern received from the target station. An indication about the coexisting radios and/or a configuration pattern may be sent to the target station as a part of negotiations. The target station may determine whether to communicate with the device via the coexisting radios based on a configuration pattern received from the source station. The target station may communicate and indication and/or a configuration pattern to the source station.

The device may be instructed in various manners. For example, the device may be instructed to at least one of stop the communications via the coexisting radios, stop the communications via the coexisting radios until information about a configuration patterns is received from the target station, stop the communications via the coexisting radios for the duration of the handover and to resume the communications after the handover based on a configuration patterns received from the source station, and continue communications via the coexisting radios during the handover.

The configuration pattern may comprise a time division multiplexing pattern. The communications via the coexisting radios can be separated based on a time division multiplexing pattern determined by a source and/or target base station. The time division multiplexing pattern may be communicated in a handover command.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 to 4 to assist in understanding the technology underlying the described examples.

Figure 1:
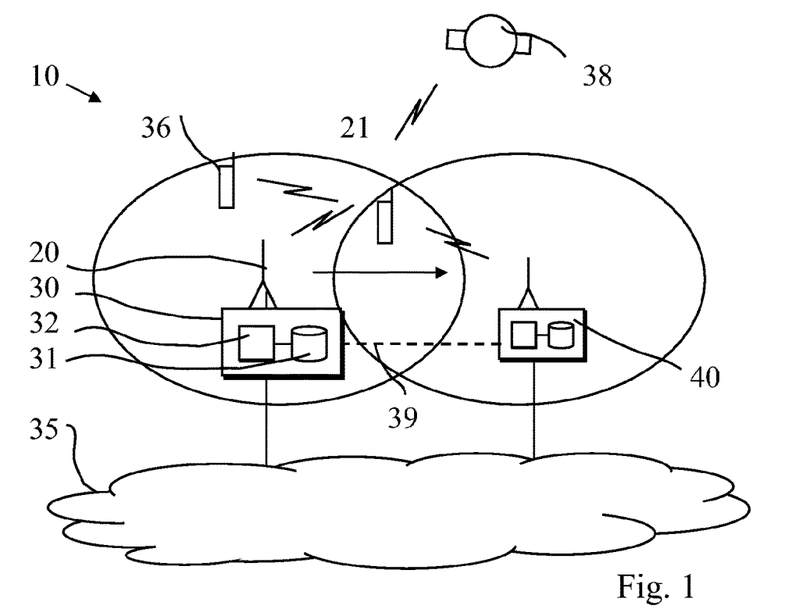
FIG. 1 shows an example of a communication system wherein below described examples of the invention may be implemented.

A mobile communication device 21 is typically provided wireless access via at least one access node such as a base station or similar wireless transceiver node of an access system. An access system may be provided by a cell of a cellular system or another radio service system enabling a communication device to access a communication system. In FIG. 1 base stations 20 and 40 provide each a radio service area or a cell of a cellular system. The cell borders are shown schematically by the oval shaped patterns. However, it is noted that this is only for illustration purposes. It is also noted that a great number of radio service areas may be provided in a communication system and that a mobile communication device may simultaneously be located in a plurality of cellular service areas. Also, the base station sites 20 and 40 can provide more than one cell and/or a plurality of sectors, for example three radio sectors, each sector providing a cell or a sub radio service area of a cell.

A base station is typically controlled by at least one appropriate controller so as to enable operation thereof and management of mobile communication devices in communication with the base station. The control apparatus can be interconnected with other control entities. In FIG. 1 a control apparatus of base station 20 is shown schematically as being provided by block 30. A suitable control apparatus can be provided with memory capacity 31 and at least one data processor 32. The control apparatus and functions may be distributed between a plurality of control units.

A non-limiting example of communication systems is the long-term evolution (LTE) of the Universal Mobile Telecommunications System (UMTS) that is standardized by the 3rd Generation Partnership Project (3GPP). A LTE base station is known as evolved NodeB (eNB) in the vocabulary of the 3GPP specifications. LTE based systems can employ a mobile architecture known as the Evolved Universal Terrestrial Radio Access Network (E-UTRAN). Base stations may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio services providing a mobile device with access to a communication system include those provided by stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

In FIG. 1 example stations 20 and 40 are connected to a wider communications network 35. A controller may be provided for coordinating the operation of the access systems. A gateway function may also be provided to connect to another network via the network 35. The other network may be any appropriate network. A wider communication system may thus be provided by one or more interconnect networks and the elements thereof, and one or more gateways may be provided for interconnecting various networks. Base stations 20 and 40 can be connected for signalling purposes, as indicated by the dashed fine 39. The connection between the base stations may involve intermediate nodes of one or more cellular networks.

The mobile communication device 21 may further communicate with for example another mobile device 36. This communication may be provided by means of a short range link, for example, by means of Bluetooth™ connectivity. FIG. 1 also shows a satellite 38 with which the mobile device 21 may receive and/or receive and transmit radio signals. The satellite may be a satellite of a positioning system or a satellite based communication system.

Figure 2:
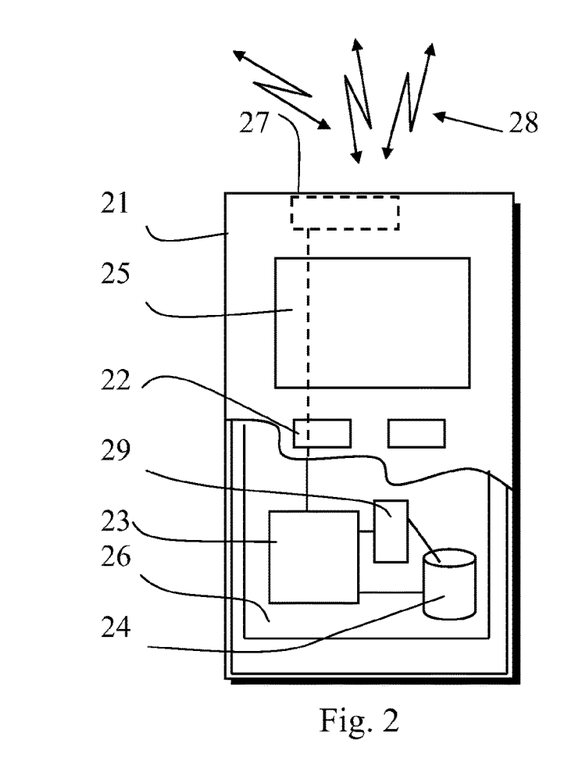
FIG. 2 shows an example of a communication device.

FIG. 2 shows a schematic, partially sectioned view of a communication device 21 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Data processing and memory functions provided by the control apparatus of the mobile device to cause control and signalling operations in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device 21 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system. A more detailed example of possible radio components is shown in FIG. 3.

In order to allow users to access various networks and services ubiquitously, a user equipment can be equipped with multiple coexisting radio transceivers. However, this can cause interference, and more particularly, coexistence interference between those collocated radio transceivers. In-device coexistence interference can occur for example when transmitting in one frequency band interferes with receiving in another, within the same user equipment. FIG. 3 shows an example of coexistence interference in a multi-radio device.

Due to the proximity of multiple radio transceivers within the same device, the transmit power of one transmitter may be much higher than the received power level of another receiver. By means of filter technologies and sufficient frequency separation, the transmit signal may not result in significant interference. But for some coexistence scenarios, e.g. when different radio technologies operating on adjacent frequencies are used within the same user equipment, the state-of-the-art filter technology may not always provide sufficient interference rejection. Therefore, it may not always be possible to solve the interference problem by a single generic radio frequency (RF) design.

Figure 3:
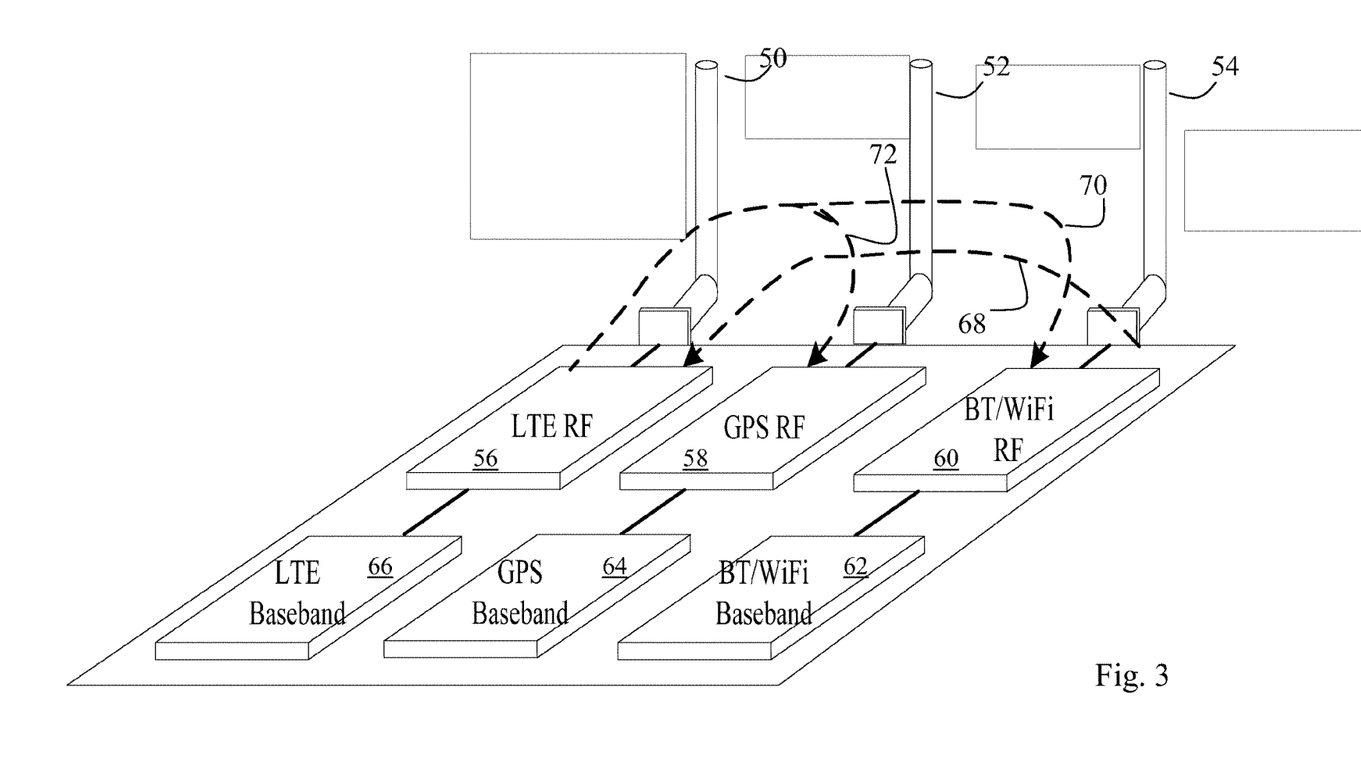
FIG. 3 shows an example of a multi-radio communication device.

In the example of FIG. 3, a device 21 has a first antenna 50, a second antenna 52 and a third antenna 54. The first antenna 50 is configured to transmit and receive LTE signals. The second antenna 52 is configured to receive GPS (global positioning system) signals. The third antenna 54 is configured to transmit and receive Bluetooth™ and/or WiFi™ signals. The first antenna 50 is connected to an LTE radio frequency processor 56 which is arranged to process the radio frequency signals. The LTE radio frequency processor 56 is coupled to an LTE baseband processor 66 which is arranged to process the radio frequency signals to convert those signals to the baseband and to process those signals. Similarly, the second antenna 52 is coupled to a GPS radio frequency processor 58, which is arranged to be coupled to the GPS baseband processor 64. Finally, the third antenna 54 is connected to a Bluetooth™/Wi-Fi™ radio frequency processor 60 which in turn is connected to the Bluetooth™/Wi-Fi™ baseband processor 62. It should be appreciated that when the respective antenna receives a radio frequency signal, that radio frequency signal is provided to the respective radio frequency processor. The radio frequency processor may carry out any suitable processes, for example, filtering the desired signal from the undesired signals and/or amplification. The processed radio frequency signal is then provided to the respective baseband processor for down-conversion to the baseband and further processing. In the case of transmission, the baseband processors will receive the signals at the baseband and up-convert those signals to the radio frequency. Other processing may be carried out by the baseband processors. Those radio frequency signals are then passed to the respective radio frequency processor.

The processing carried out by the respective blocks can be performed by a single block or processor, or by more than two blocks or processors. The division of the processes between the blocks can of course be changed. For example, the RF processing block may, for example, in some embodiments perform the baseband conversion, at least one of converting down to the baseband or up-converting to the radio frequency. Separate processors and/or antennas may be provided in some embodiments for uplink and downlink. In some embodiments, at least one processor may be used for two or more different types of signal received from and/or to be transmitted by two or more antennas. It should be appreciated that in some embodiments, the GPS blocks may only need to receive signals.

It is possible that when LTE and Industrial, Scientific and Medical (ISM; this can include technologies such as the Bluetooth™ and WLAN) radio capabilities are provided in a single device, the LTE and ISM radio within the same device may be working on adjacent frequencies. For example, the LTE may be working on the upper part of band 40 (2300-2400 MHz) and the ISM may be working in the example 2450 MHz band. This type of coexistence may cause interference. This interference between the different frequencies is schematically shown in FIG. 3 by arrowed dashed lines 68 and 70.

Figure 4:
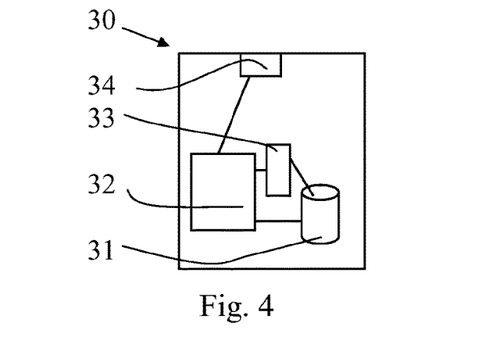
FIG. 4 shows an example of controller apparatus for a base station.

FIG. 4 shows an example of a control apparatus 30, for example to be coupled to and/or for controlling a station of a radio service area, for example one of the stations 20 and 40 of FIG. 1. The control apparatus 30 can be arranged to process and/or control signalling and other communications by mobile communication devices in a service area of a station. The control apparatus 30 can be configured to provide control functions in association with communication of information regarding handovers and/or communications via coexisting radios. The control apparatus can control use of different modes of operation and/or switch between the modes of communications in accordance with certain embodiments described below, for example for disabling one or more of the radios and/or using a different configuration pattern during a handover. For providing the control the control apparatus 30 can comprise at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

A mobile device can be handed over from a source station to a target station. In the case of LTE, for example, the handover would be between a source eNB and target eNB. For example, as shown by the arrow in FIG. 1 the mobile device 21 may move from the service area of station 20 into the service area of station 40. Other examples of triggering a handover include measurements by the mobile device, load determinations, interference and so on. The process of handover and reasons triggering handover as such are not relevant in understanding the invention, and thus do not require any more detailed explanation. Instead of the handover procedure itself, the herein described embodiments relate to information that may be communicated for the communication device to control its behaviour and to control of the subsequent communications by the mobile device in the handover.

Figure 5:
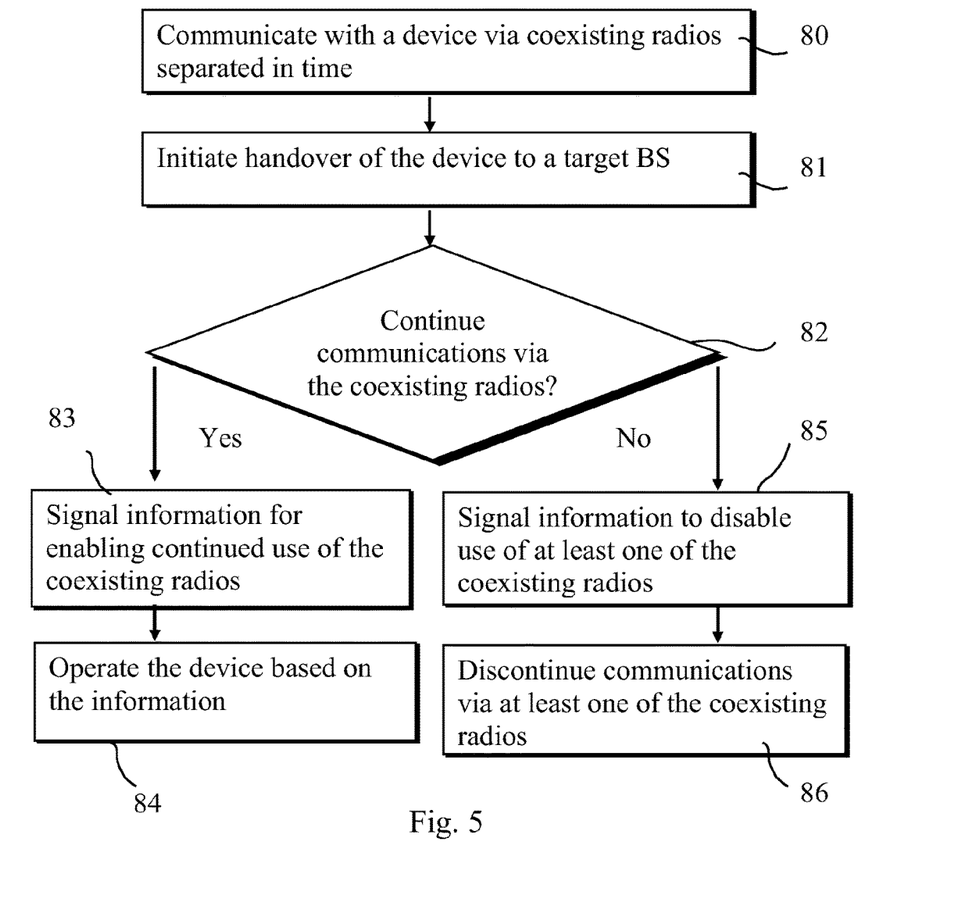
FIGS. 5 and 6 are flowcharts illustrating certain embodiments.

FIG. 5 is a flowchart in accordance with en embodiment. At step 80 a wireless device communicates with a source station via multiple coexisting radios. The communications with the different radios are separated in time domain. After it has been determined that a handover is to be performed, preparations for the handover can start at 81. It can be determined at 82 whether to continue the communications via the coexisting radios during handover to a target station or if the device shall communicate in a mode where use of coexisting radios is disabled. In response to the determination information can be selectively signalled to the device regarding the communications via the coexisting radios based on the determination. If it is determined that the communications via the coexisting radios can be continued during the handover, an indication of this and/or a configuration pattern, for example a time division multiplexing (TDM) pattern can be signalled to the device at 83. The device can then receive the indication at 84 and be operated accordingly during the handover. If it is determined at 82 that the communications on the shared time domain resource via the coexisting radios shall not be continued, information of this is signalled to the device at 85. For example, an indication disabling use of one or more of the multiple coexisting radios can be sent to the device. The device will then discontinue the simultaneous use of all the multiple radios at 86 that were active, and will use only one or some of the radios. According to a non-limiting example the indication is sent in a handover command from the source station.

Figure 6:
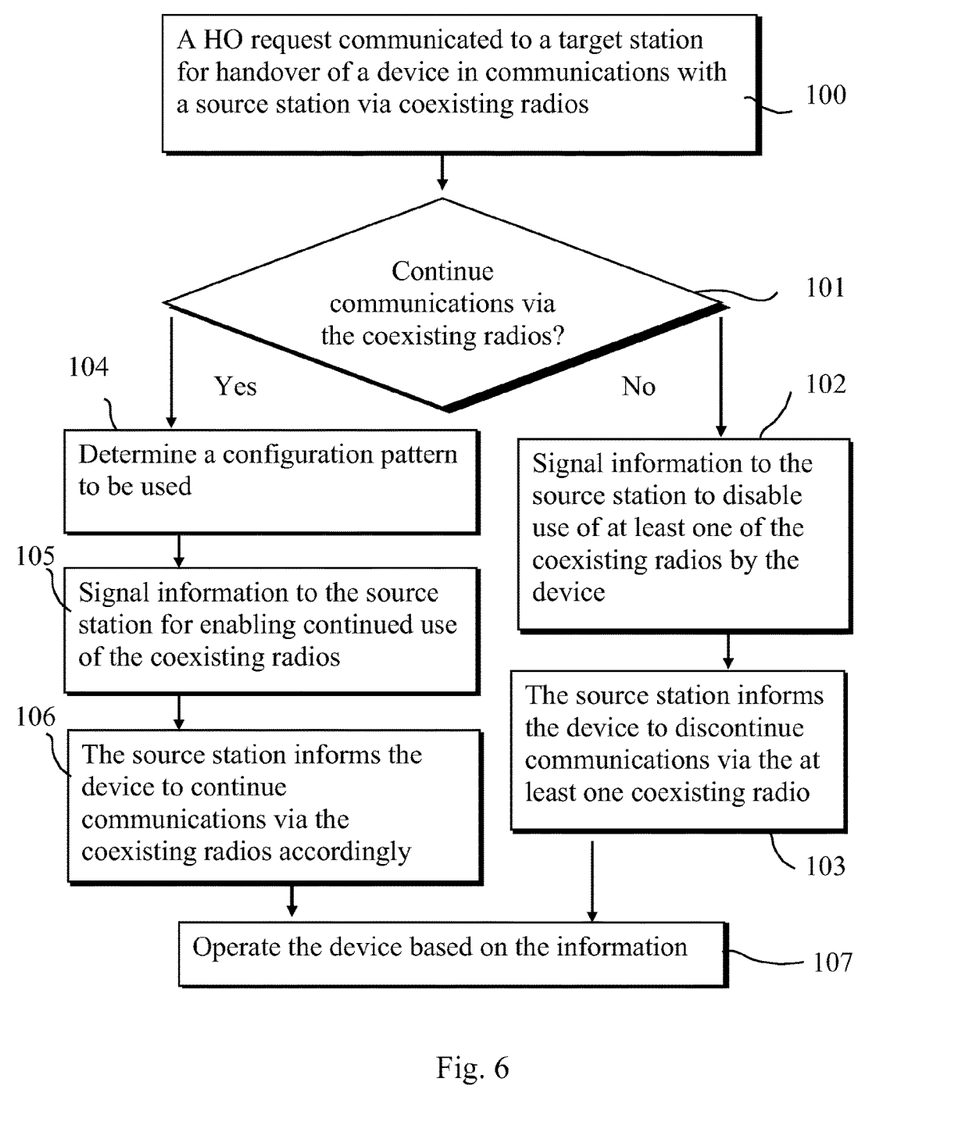

FIG. 6 shows an embodiment where a source station and a target station negotiate to determine whether and how use of active coexisting radios can be continued during handover. If it is decided that the communications can continue via the coexisting radios during the handover, an appropriate configuration pattern can be determined based on the negotiations. At step 100 a source station can communicate to a target station a request for handover of a device served by the source station. At this stage information indicating that the device communicates with the source station via a multiple of coexisting radios can be delivered to the target station. The target station can then determine at 101 whether to continue the communications via all of the coexisting radios during the handover with the device, or if another type of communications would be preferred instead.

If the decision is to discontinue the communications via the coexisting radios, the source station is informed accordingly at 102. The source station instructs the device accordingly at 103, and the device is operated based on this decision at 107 and communicates via only one of the radios, for example only via the LTE radio. In accordance with a possibility, if more than two coexisting radios were active, it may be decided that although not all of them can be maintained during the handover, communications may nevertheless continue on more than one coexisting radio.

If the decision is to accept continued communication via the coexisting radios, the target station can then determine at 104 an appropriate configuration pattern for use during the handover. An appropriate pattern may be determined to be such that it can also be used after the handover. The acceptable pattern can be a pattern proposed by the source station, or a new pattern generated by the target station. Appropriate information, for example acceptance of the proposal by the source or the new configuration pattern, can then be signalled at 105 to the source station. Upon receipt of the information the source station can instruct the device at 106 to continue its communications during the handover via the coexisting radios based on the negotiations. The device is then operated based on these instructions at 107.

According to an embodiment a disablement message at 102 can result at least one the following two possible operations. In accordance with an option the device stops its communications via the coexisting radios until it receives information from the target station regarding a new configuration patterns it shall use. According to another possible operation, the device stops its communications via the coexisting radios for the duration of the handover, but resumes to transmissions via the coexisting radios in accordance with a configuration patters it has received from the source station.

Figure 7:
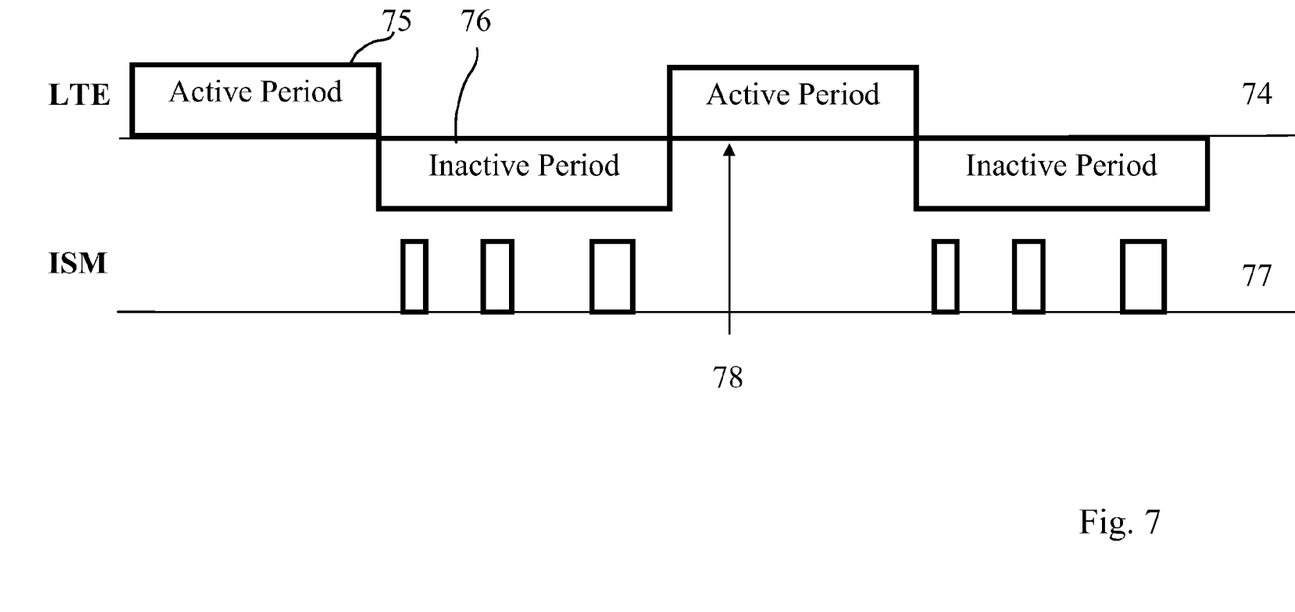
FIG. 7 shows a configuration pattern.

FIG. 7 shows a scenario where a wireless device communicates with a source base station, for example an eNB, via two coexisting radios. More particularly, simultaneous use of LTE and ISM bands 74 and 77 is shown. In the multiplexing pattern the LTE band 74 is divided in time between active periods 75 and inactive periods 76. As shown, the ISM communications 77 can take place during periods where no LTE transmissions are scheduled. The following describes an example in relation to handover of a wireless device when a time division multiplexing (TDM) solution is applied in a source cell provided by a LTE eNB. Possibilities for a time division multiplexing (TDM) solution include a discontinuous reception (DRX) based solution, a hybrid automatic repeat request (HARQ) process reservation based solution and a solution based on LTE/ISM denial. In the following use of a DRX based solution where the network provides control based on information from the wireless user device is assumed.

If the device experiences in-device coexistence interference and cannot solve the situation by itself, the device can send on indication to report the problem. For example, the device can provide the source base station or eNB with a desired time division multiplexing (TDM) pattern. The source base station can then decide and signal the final DRX configuration to the device based on the tentative TDM pattern suggested by the device and other possible criteria, for example traffic type. Accordingly, the device can then separate the LTE and ISM signalling in active and inactive time periods 75 and 76, respectively.

A problematic situation may occur when the device is moving towards another base station or eNB, as illustrated by the arrow in FIG. 1. It is likely that the serving or source base station would like to hand over the device to the other, i.e. target base station. The point of triggering a handover is shown by the arrow 78. If the device is operated according to the TDM solution in the serving base station and a normal handover (intra-frequency or inter-frequency) is triggered from the source base station to the target base station, the device can operate in various ways in such a situation. For example, the device can autonomously quit from TDM solution immediately after receiving the handover command from the source base station. This would enable use of the existing handover procedure without any changes. However, due to the in-device coexistence interference, both the handover signalling for accessing to the target station and the ISM band transmission can become corrupted, and a handover failure can result. According to another possibility the device can deny ISM transmission during the handover procedure. This can be used to ensure proper transmission of LTE signals but means that the ISM transmission is blocked for a period of time. After the handover completion, the device may then need to recover the ISM connection, for example by re-associating with an access point in WLAN due to lost beacon information. It is also possible that the device continues operate according to the TDM solution during the handover procedure. This would provide transmission opportunity for both LTE and ISM signals during the handover procedure. However, due to the time separation the handover interruption time can be come intolerable if the inactive time period is too long and immediately follows before the completion of the handover procedure.

Dropping of the ISM band would mean sacrificing the ISM capability to ensure LTE handover completion, and on the other hand, continuing use of the TDM solution would provide transmission opportunity for both LTE and ISM. However, the latter solution can be applied only for a proper TDM pattern. To resolve the situation, the source eNB and/or the target eNB can determine how to proceed and indicate to the device whether it shall continue to use the TDM solution during the handover procedure.

In accordance with an embodiment the source eNB sends an indication to the device whether it should continue to operate according to the previous TDM solution during the handover procedure. The indication can be based on the source eNB's own decision. According to a possibility the decision is based, at least partially, on negotiations with the target eNB.

If the source eNB indicates that the device shall continue to operate according to the previous TDM solution, the device shall follow the previous TDM pattern until a new TDM pattern or for example a frequency division multiplexing (FDM) solution is configured by the target eNB. The target eNB can communicate with the device according to the TDM pattern it receives from the source eNB until the new configuration is confirmed by the device.

It can be determined as a result of negotiations between the source eNB and the target eNB that a new TDM pattern is to be used during the handover. The source eNB can forward the new TDM pattern to the device. The pattern can be signalled besides the indication of continued use of the TDM solution in a handover command. The device can use the new TDM pattern to communicate with the target eNB until a newer TDM configuration or FDM solution is confirmed by the device.

If an eNB indicates that the device shall not continue with the TDM solution, the device shall stop the use of the TDM pattern immediately and thus discontinue the TDM mode via the coexisting radios after receiving the handover command and continue in a normal LTE transmission mode.

Figure 8:
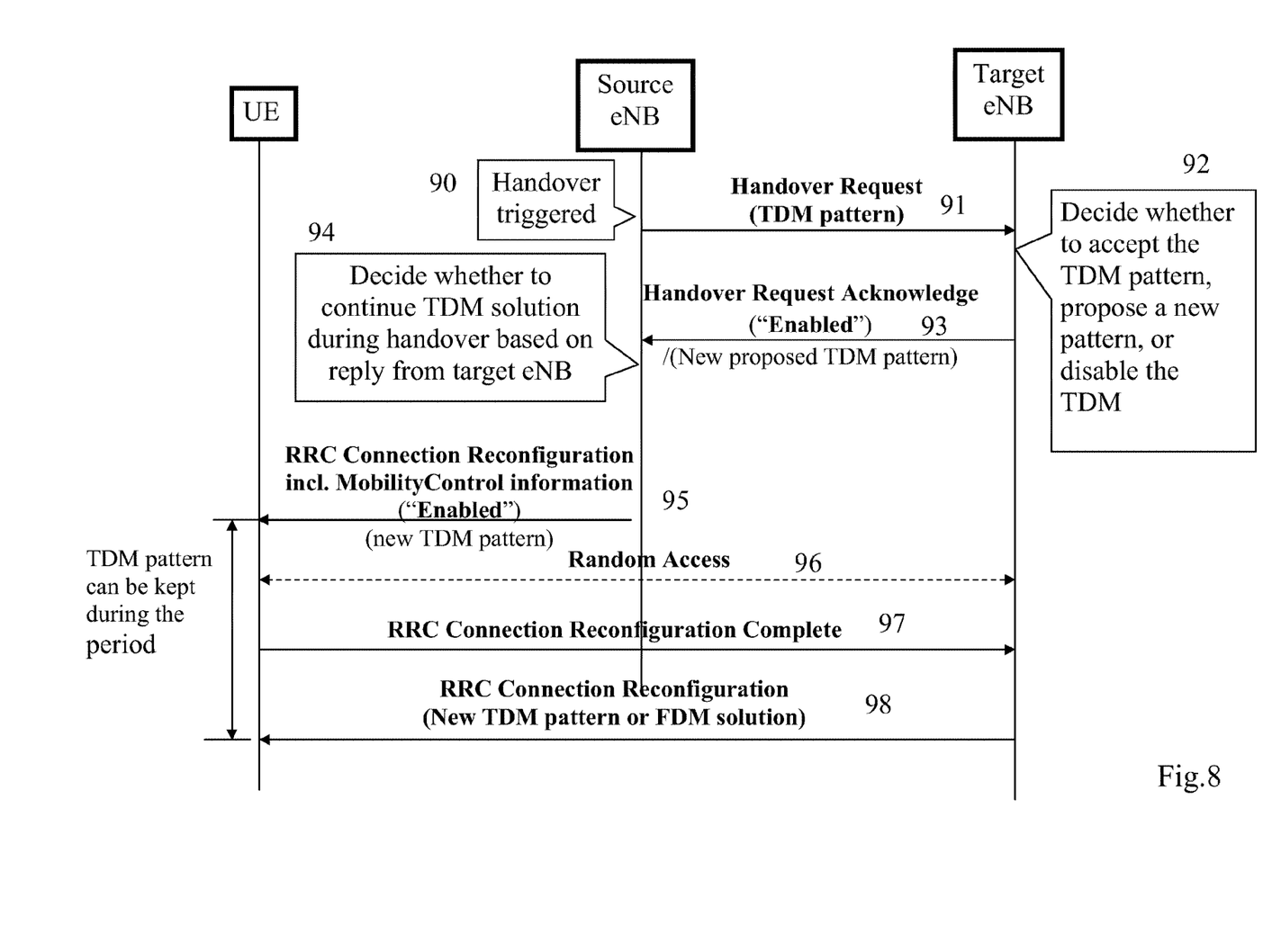
FIG. 8 is a signalling flowchart illustrating an embodiment.

FIG. 8 shows in a signalling flowchart an example for possible negotiations between a source eNB and a target eNB for handing over a device UE. After a handover is triggered at 90, the source eNB can send a handover request at 91 to the target eNB. The eNBs can negotiate the TDM mode configuration parameter during the handover preparation phase. The source eNB can forward the current TDM mode configuration parameters to the target eNB and ask the target eNB whether it can accept the TDM pattern during the handover procedure. The target eNB then determines at 92 how it would like to proceed. The target eNB can keep the received configuration or propose a new TDM configuration to the source eNB. Alternatively, it can determine that the TDM operation shall be disabled at least for the duration of the handover.

If the target eNB decides that it can accept the proposed TDM pattern and serve the device UE in this pattern, it can reply accordingly at 93 to the source eNB by indicating that the TDM pattern is "enabled", as shown in the example of FIG. 8. Alternatively, the target eNB can propose a new TDM pattern (this alternative is shown below the signalling arrow 93), or send an indication that it wants the TDM operation be disabled during the handover period.

The source eNB then determines at 94, based on the response, how to proceed. The source eNB can inform the device UE to start handover at 95. At this command message the source eNB can inform the device UE to keep the TDM transmissions. This is illustrated by the "Enabled" parameter in message 95. Alternatively, the parameter can be set to "disabled", if the TDM operation is not to be continued. A possible new TDM pattern can also be signalled to the device UE for use during the handover transmissions. In accordance with a possibility a TDM pattern in message 95 serves as an indication that the TDM mode shall be used.

The device UE and the source and target eNBs then carry out the TDM transmission during processing of the handover. The handover can comprise operations such as random access by the device to the target eNB at 96, completion of RRC connection reconfiguration by the device at 97 and by the target eNB at 98. The target eNB can at this stage replace the TDM pattern by a new pattern, or taken other appropriate action, for example command use of a frequency division multiplexing (FDM) based solution.

In accordance with an embodiment the source eNB configures a new TDM pattern for the handover procedure. The new proposed TDM handover pattern can be signalled to the target eNB in message 91. Use of the pattern can then be confirmed by the target eNB by message 93 and this pattern is then configured to the device. The device then operates the TDM solution using the new TDM pattern during the handover.

The various embodiment above can be provided as alternatives or as complementary solutions.

The required data processing apparatus and functions of a base station apparatus, a communication device and any other appropriate station or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on the LTE systems and 3GPP based systems, similar principles can be applied to other communication systems and channels where in-device interference may occur. For example, this may be the case in applications where no fixed station equipment is provided but a communication system is provided by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
communicating a first communication with a device configured to use coexisting radios and a first time division multiplexing configuration for separating the first communication and at least one second communication communicated via the coexisting radios;
determining a second time division multiplexing configuration for use during handover of the device to a target station;
signaling information indicative of the second time division multiplexing configuration to the device;
informing the device to start handover to the target station; and
communicating the first communication using the second time division multiplexing configuration until handover to the target station is completed,
wherein the second time division multiplexing configuration is determined such that the at least one second communication is maintained until handover to the target station is completed.

2. The method as claimed in claim 1, wherein the determining comprises taking into account information received from the target station.

3. The method as claimed in claim 1, further comprising sending indication about the coexisting radios to the target station.

4. The method as claimed in claim 2, further comprising determining the second time division multiplexing configuration by taking into account a tentative time division multiplexing configuration received from the device.

5. A method comprising:
receiving a request for handover of a device from a source station and an indication that the device is configured to use coexisting radios and time division multiplexing for separating a first communication with the source station and at least one second communication communicated via the coexisting radios;
determining a time division multiplexing configuration for use during handover from the source station; and
signaling information indicative of the time division multiplexing configuration to the source station,
wherein the time division multiplexing configuration is determined such that the at least one second communication is maintained until handover from the source station is completed.

6. The method as claimed in claim 5, wherein the time division multiplexing configuration is based on a time division multiplexing configuration received from the source station.

7. A method of a device comprising:
communicating a first communication with a source station and at least one second communication via coexisting radios using a first time division multiplexing configuration for separating the first communication and the at least one second communication;
receiving information indicative of a second time division multiplexing configuration from the source station;
receiving information to start handover to a target station;
processing the handover; and
communicating the first communication and the at least one second communication via the coexisting radios using the second time division multiplexing configuration until handover to the target station is completed.

8. The method as claimed in claim 7, wherein the information indicative of the second time division multiplexing configuration is received in a handover command.

9. An apparatus comprising:
at least one processor, and
at least one memory including computer program code, wherein the at least one memory and the computer program code are configured, with the at least one processor, to cause the apparatus to:

communicate a first communication with a device configured to use coexisting radios and a first time division multiplexing configuration for separating the first communication and at least one second communication communicated via the coexisting radios;

determine a second time division multiplexing configuration for use during handover of the device to a target station;

signal information indicative of the second time division multiplexing configuration to the device;

inform the device to start handover to the target station; and communicate the first communication using the second time division multiplexing configuration until handover to the target station is completed, wherein the second time division multiplexing configuration is determined such that the at least one second communication is maintained until handover to the target station is completed.

10. An apparatus comprising:

at least one processor, and at least one memory including computer program code, wherein the at least one memory and the computer program code are configured, with the at least one processor, to cause the apparatus to:

receive a request for handover of a device from a source station and an indication that the device is configured to use coexisting radios and time division multiplexing for separating a first communication with the source station and at least one second communication communicated via the coexisting radios;

determine a time division multiplexing configuration for use during handover from the source station; and signal information indicative of the time division multiplexing configuration to the source station, wherein the time division multiplexing configuration is determined such that the at least one second communication is maintained until handover from the source station is completed.

11. An apparatus for a device comprising:

at least one processor, and at least one memory including computer program code, wherein the at least one memory and the computer program code are configured, with the at least one processor, to cause the apparatus to:

communicate a first communication with a source station and at least one second communication via coexisting radios using a first time division multiplexing configuration for separating the first communication and the at least one second communication;

receive information indicative of a second time division multiplexing configuration from the source station;

receive information to start handover to a target station;

process the handover; and communicate the first communication and the at least one second communication via the coexisting radios using the second time division multiplexing configuration until handover to the target station is completed.

12. A computer program product comprising a non-transitory computer-readable storage medium bearing computer program code embodied therein for use with a computer, the computer program code comprising code for performing the method of claim 1.

13. A computer program product comprising a non-transitory computer-readable storage medium bearing computer program code embodied therein for use with a computer, the computer program code comprising code for performing the method of claim 5.

14. A computer program product comprising a non-transitory computer-readable storage medium bearing computer program code embodied therein for use with a computer, the computer program code comprising code for performing the method of claim 12.

15. The method in claim 1, wherein the at least one second communication is maintained by providing transmission opportunity for the at least one second communication.

16. The method in claim 5, wherein the at least one second communication is maintained by providing transmission opportunity for the at least one second communication.

17. The apparatus in claim 9, wherein the at least one second communication is maintained by providing transmission opportunity for the at least one second communication.

18. The apparatus in claim 10, wherein the at least one second communication is maintained by providing transmission opportunity for the at least one second communication.

* * * * *